(12) United States Patent
Ravichandran

(10) Patent No.: US 11,196,779 B2
(45) Date of Patent: Dec. 7, 2021

(54) TRANSFER OF A COMMUNICATIONS SESSION TO ANOTHER USER EQUIPMENT

(71) Applicant: T-Mobile USA, Inc., Bellevue, WA (US)

(72) Inventor: Vinod Ravichandran, Renton, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 16/220,952

(22) Filed: Dec. 14, 2018

(65) Prior Publication Data

US 2019/0373027 A1   Dec. 5, 2019

Related U.S. Application Data

(60) Provisional application No. 62/678,161, filed on May 30, 2018.

(51) Int. Cl.
*G06F 15/16* (2006.01)
*H04L 29/06* (2006.01)

(52) U.S. Cl.
CPC ...... *H04L 65/1083* (2013.01); *H04L 65/1006* (2013.01); *H04L 65/1073* (2013.01); *H04L 65/403* (2013.01); *H04L 65/608* (2013.01)

(58) Field of Classification Search
USPC ................................................ 709/227, 231
See application file for complete search history.

(56) References Cited

U.S. PATENT DOCUMENTS

| | | | | |
|---|---|---|---|---|
| 6,983,370 | B2* | 1/2006 | Eaton ..................... | H04L 51/04 713/153 |
| 7,734,793 | B2* | 6/2010 | Bowman-Amuah ... | H04L 67/14 709/228 |
| 8,244,043 | B2* | 8/2012 | Chang ..................... | G06K 9/00 382/218 |
| 8,914,833 | B2* | 12/2014 | Yao .................. | H04N 21/47202 725/93 |
| 9,178,773 | B1* | 11/2015 | Tassone ............. | G06F 3/04847 |
| 9,355,240 | B2* | 5/2016 | Menon .................... | G06F 21/35 |
| 10,142,423 | B2* | 11/2018 | Verger ................. | H04L 67/148 |
| 10,164,973 | B1* | 12/2018 | Prasad ................ | H04L 63/0861 |
| 10,298,699 | B2* | 5/2019 | Jurgenson .............. | H04W 8/22 |
| 10,491,685 | B2* | 11/2019 | Khayrudinov ........ | H04L 67/148 |
| 10,530,932 | B2* | 1/2020 | Tevonian ............ | H04L 65/1063 |
| 10,701,310 | B2* | 6/2020 | Pandey ............... | H04L 65/1073 |
| 10,735,597 | B1* | 8/2020 | Zagorski .................. | G06T 7/70 |

(Continued)

*Primary Examiner* — Anthony Mejia
(74) *Attorney, Agent, or Firm* — Lee & Hayes, P.C.

(57) ABSTRACT

This disclosure is directed to engaging in a communications session, such as an audio call, video call, and/or an audio/video (A/V) call, using a first user equipment (UE) and then seamlessly switching to a second UE while the communications session is in progress. The A/V call system may be configured to provide an indication to the first UE of other UEs that may be registered with it using a common user account. The first UE may enable a user to select another of his or her UEs to transfer the ongoing communications session. The first UE may send the A/V call system a request to transfer of the communications session. The A/V system may add the second UE to the communications session and disengage the first UE from the communications session.

20 Claims, 11 Drawing Sheets

(56) References Cited

U.S. PATENT DOCUMENTS

| | | | |
|---|---|---|---|
| 10,841,756 B1* | 11/2020 | Sathyanarayana Rao | H04L 61/1594 |
| 2003/0154398 A1* | 8/2003 | Eaton | G06Q 30/08 709/227 |
| 2007/0121869 A1* | 5/2007 | Gorti | H04L 65/80 379/201.02 |
| 2010/0058412 A1* | 3/2010 | Maisonneuve | H04N 21/2381 725/109 |
| 2010/0215036 A1* | 8/2010 | Eom | H04L 51/36 370/352 |
| 2013/0212287 A1* | 8/2013 | Chappelle | H04M 3/42263 709/227 |
| 2013/0342637 A1* | 12/2013 | Felkai | H04L 69/24 348/14.08 |
| 2014/0085399 A1* | 3/2014 | Modai | H04L 65/605 348/14.01 |
| 2014/0258554 A1* | 9/2014 | Amsterdam | H04N 21/44016 709/231 |
| 2014/0359709 A1* | 12/2014 | Nassar | H04L 65/1083 726/4 |
| 2015/0026351 A1* | 1/2015 | Calman | H04L 65/1083 709/227 |
| 2016/0014061 A1* | 1/2016 | Cholkar | H04L 65/1089 709/206 |
| 2016/0048841 A1* | 2/2016 | Johnson | G06Q 30/01 705/304 |
| 2016/0112464 A1* | 4/2016 | Nyshadham | H04L 65/1069 709/227 |
| 2016/0173540 A1* | 6/2016 | Linden | H04L 65/1083 705/26.8 |
| 2016/0316414 A1* | 10/2016 | Yeoum | H04M 3/58 |
| 2017/0149850 A1* | 5/2017 | Lam | H04W 4/14 |
| 2018/0091655 A1* | 3/2018 | Verma | H04W 4/023 |
| 2018/0343309 A1* | 11/2018 | Mishra | H04L 63/08 |

\* cited by examiner

TRANSFER OF A COMMUNICATIONS SESSION TO ANOTHER USER EQUIPMENT

CROSS-REFERENCE TO RELATED APPLICATIONS

This application claims priority to U.S. Provisional Patent Application No. 62/678,161, filed May 30, 2018, which is hereby incorporated by reference, in its entirety.

BACKGROUND

With the proliferation of personal electronic devices, such as smartphones, tablet computers, and desktop computers, people often have many choices of which one of their devices to use for various applications. These devices may often be used for communications, such as for audio calls, video calls, and/or audio/video (A/V) calls. Sometimes a user may wish to change a user equipment from which he or she wishes to conduct a communications session while he or she is already in that communications session.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Figure 1:
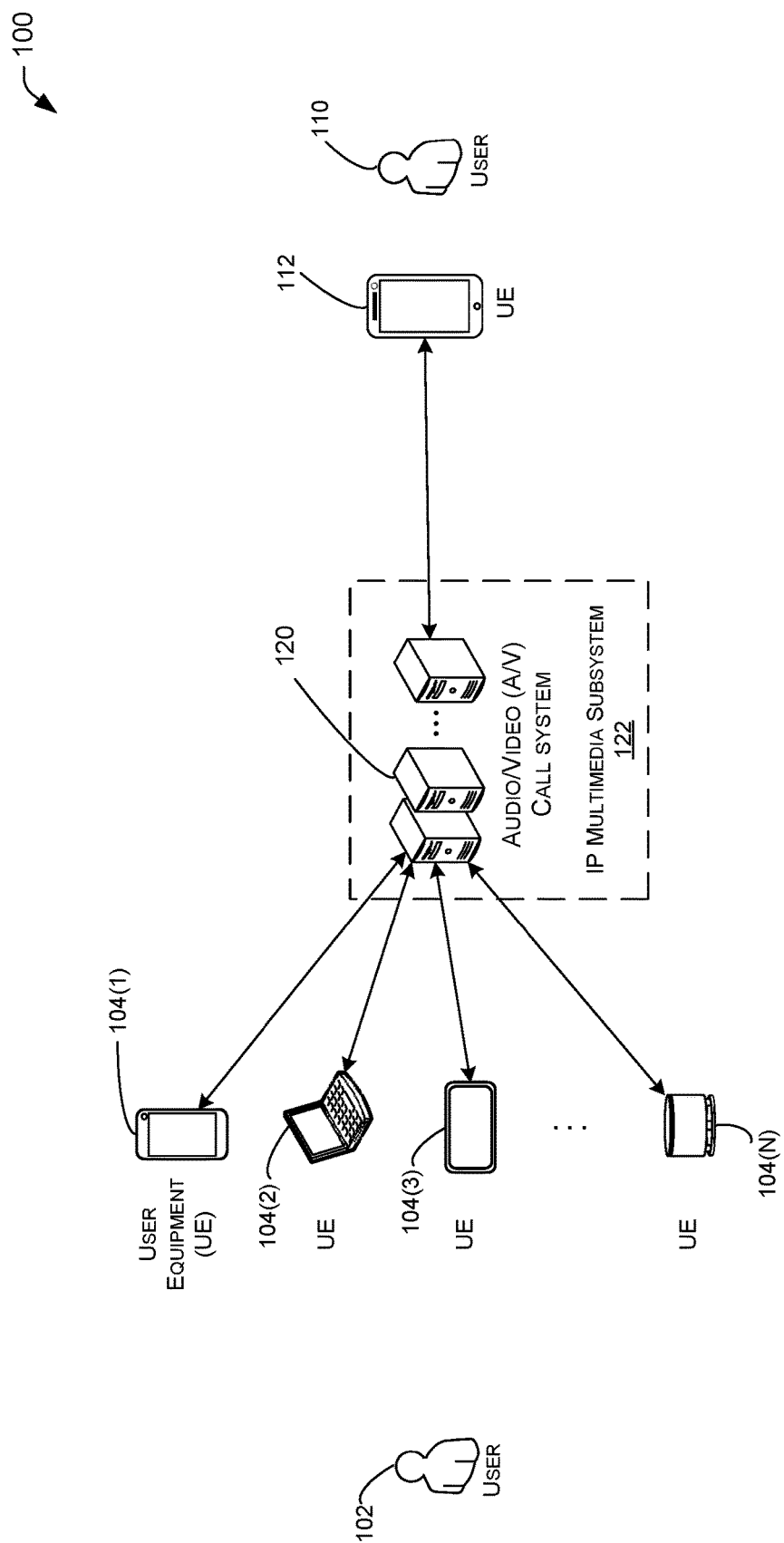
FIG. 1 illustrates a schematic diagram of an example environment with a variety of elements that provide the ability to conduct a communications session and transfer that communications session from one user equipment to another user equipment, in accordance with example embodiments of the disclosure.

Example embodiments of this disclosure describes methods, apparatuses, computer-readable media, and systems for transferring a communications session, such as an audio/video (A/V) call from one user equipment (UE) associated with a user to another UE associated with the user. For example, a user may engage in a video call with one or more other people, via an A/V call system, and using his or her laptop computer. The user, while the video call is occurring, may wish to transfer the call from his or her notebook computer to his or her smartphone without interrupting the video call. The user may select an option on his or her notebook computer to initiate the transfer, and responsive to this selection, the A/V call system may transfer the video call to the smartphone, according to example embodiments of the disclosure. This transfer may occur seamlessly and without the other participants of the video call knowing that the transfer has taken place.

The transfer process may, in example embodiments, include registration of more than one UE (e.g., notebook computer, tablet computing device, smartphone, etc.) of a user with the A/V call system. Individual ones of the UEs may execute an A/V call application stored thereon that may enable to UE to cooperate with the A/V call system to place, receive, and/or transfer audio and/or video calls, as disclosed herein. The UE may be able to register itself with the A/V call system, such as by logging into the A/V call system. The logging in process may include the UE presenting authentication credentials (e.g., user name, password, authentication certificates, etc.) corresponding to the user and/or his or her user account to the A/V call system. Once the UE is registered with the A/V call system to receive and/or make audio, video, or A/V calls. Additionally, the UE may subscribe to receive registration information of additional UEs that may be associated with the user and registered on the A/V call system.

When the A/V call system registers a new UE, it may determine if that registration is to be notified to any other UEs. If there are UEs subscribed to receive a notification of UEs being registered to the same user and/or user account, then the A/V call system may notify the UE of the registration of the new UE. The A/V call system, if the new UE is subscribed to receive notification of the registration of other UEs associated with the same user, then the new UE may also be notified that another UE is already registered on the A/V call system. In this way, as new UEs associated with the same user account are registered onto the A/V call system to receive, place, and/or transfer calls, those UEs may be aware of other UEs that are registered with the same user account. A UE may also be configured to display, such as on its display screen, to the user, other UEs that may be registered with the user's user account at the A/V call system.

When a user wishes to initiate a communications session with another user, the A/V call system may connect UEs of both the users via any suitable protocol, such as real-time transport protocol (RTP), to conduct any suitable communications session, such as an audio call, a video call, and/or an A/V call. At this point, the UE (e.g., either the caller's UE or the callee's UE) may display a list or other information associated with other UEs that are registered with the A/V call system to which the current communications session may be transferred. The UE may be configured to receive user input, such as via a user interface, that indicates another registered UE to which to transfer the communications session. The UE may notify the A/V call system of the user's desire to transfer the communications session to another of the user's UEs.

The A/V call system, upon receiving an indication that it is to transfer an active call session from an initial UE to another UE registered to the same user account, may initiate a communications session with the other UE. Once the other UE is added to the ongoing communications session, the initial UE may be disconnected from the call session. In this way, the communications session may be transferred from one of a user's UEs to another of the user's UEs. This transfer, having taken place, may not be known by the other party or parties to the communications session and may be seamless in execution from the perspective of each of the parties to the communications session.

It should be appreciated that the mechanisms, as disclosed herein, may provide flexibility to users conducting communications sessions, such as A/V conference calls, in being able to conduct the communications session using a UE that may be most convenient throughout the duration of the communications session. For example, if an individual would like to conduct a communications session in his or her office desktop computer that has a large display screen, he or she may do so. However, if this individual needs to head to his or her car to commute to another appointment, he or she may wish to transfer the communications session to his or her smartphone to participate in the meeting while commuting. In this way, the disclosure herein provides the ability for individuals to choose which one of their devices to use throughout the duration of a communications session. In the example above, the user may benefit from the large display screen(s) of his or her work desktop computer, during a portion of the communications session, but also benefit from the mobility afforded by his or her smartphone during another portion of the communications session. Furthermore, the user is able to transfer the communications session from one of his or her UE to another without the user having to call in again, disconnect the first UE, miss any part of the meeting, or disrupt or distract the other participant(s) in the communications session.

Certain implementations and embodiments of the disclosure will now be described more fully below with reference to the accompanying figures, in which various aspects are shown. However, the various aspects may be implemented in many different forms and should not be construed as limited to the implementations set forth herein. It will be appreciated that the disclosure encompasses variations of the embodiments, as described herein. Like numbers refer to like elements throughout.

FIG. 1 illustrates a schematic diagram of an example environment 100 with a variety of elements that provide the ability to conduct a communications session and transfer that communications session from one user equipment (UE) 104(1), 104(2), . . . , 104(N) to another UE 104(1), 104(2), . . . , 104(N), in accordance with example embodiments of the disclosure.

The example environment 100 may include the user 102. The user 102 may be able to engage in communications sessions, such as audio calls, video calls, or audio/video (A/V) calls via his or her UE(s) 104(1), 104(2), . . . , 104(N), hereinafter referred to individually or in plurality as UE 104 or UEs 104. The UEs 104 may be associated with (e.g., belong to) the user 102 and the user may be able to interact with the UEs 104 to engage in a communications session, in accordance with example embodiments. The user 102 may be able to conduct the communications session with another user 110 via his or her UE 112. The UE 104 and UE 112 may be joined in the communications session via an audio/video (A/V) call system 120.

Although the UEs 104 are depicted as a smartphone 104(1), a laptop computer 104(2), a tablet computer 104(3), and a voice device 104(N), it will be appreciated that the UEs 104 may be any suitable UE 104 that can make, receive, and/or transfer communications sessions, such as A/V calls. UE 104 include, but is not limited to, televisions, set-top boxes, computers, computing devices, servers, notebook computers, netbook computers, personal digital assistants (PDAs), smartphones, telephones, tablets, in-vehicle infotainment systems (IVIs), combinations thereof, or the like.

The UEs 104 may have a communications application and/or software installed thereon that allows the UEs 104 to interact with the user 102 to conduct the communications session. This communications application running on the UE 104 may be pre-installed, downloaded from an application store, or received and/or installed on the UE 104 by any other suitable mechanism. The communications application, as operating on the UE 104, may enable the UE 104 to establish a user account with the A/V call system 120, register with the A/V call system 120 to send and/or receive invitations to start a communications session, establish and/or conduct a communications sessions with another UE 112, and/or transfer a communications session from a first UE 104 to another UE 104.

Establishing the user account may entail the UE 104 cooperating with the A/V call system 120 to enable the user 102 access to the A/V call system 120 for conducting communications sessions with other users 110 who are enabled, via their UE 112, to engage in communications sessions. The user account may have authentication credentials associated therewith, which may be used for logging in to the user account to enable access to the services of the A/V call system 120. These authentication credentials may be of any suitable type, including, but not limited to a login, password, name, email address, authentication certificate (e.g., a X.509 certificate), personal information, two-factor authentication information, combinations thereof, or the like. When the user account is established on the A/V call system 120, the UE 104 may use the authentication credentials of the user 102 to register itself with the A/V call system 120 to use the services provided by the A/V call system 120.

When the UE 104 registers itself, it notifies the A/V call system 120 that it is able to conduct a communications session via the A/V call system 120 with the user account associated with the user 102. The A/V call system 120 is then able to conduct a communications session for the user account via the UE 104 with one or more other UEs 112 registered with other users 110 or their respective user accounts. These communications sessions may be conducted using any suitable protocols and/or standards, such as real-time transport protocol (RTP). When the UE 104, operating the communications application thereon, registers itself with the A/V call system 120, the UE 104 may also subscribe to notifications that informs the UE 104 about any other UEs 104 that may register with the A/V call system 120 with the same user account. In this way, each of the UEs 104 of a particular user 102 may be able to identify other UEs of the particular user 102 that are also registered with the A/V call system 120 to receive services provided by the A/V call system 120.

A particular UE 104 may be configured to receive an indication from the A/V call system 120 that another UE 104 associated with the user 102 (e.g., the same user account) may have been registered with the A/V call system 120. When the particular UE 104 receives this indication, it may display, such as on a display screen of the UE 104, that the other UE 104 is also registered with the A/V call system 120 for the same user account. In this way, the user 102 be aware that both, or more than two UEs 104, as the case may be, of his or her UEs 104 are registered with the A/V call system 120. Thus, individual ones of the UEs 104 may display, to the user 102, other of the UEs 104 that the user 102 may use to interact with the A/V call system 120 to conduct communications sessions. The indication of other UEs 104 that are available to the user 102 may be received by the UE 104 and/or displayed by the UE 104 to the user 102, either when the UE 104 is idle or when the UE 104 is engaged in a communications session. In other words, according to example embodiments, if a UE 104 associated with a particular user 102 is conducting a communications session and another UE 104 associated with the particular user 102 registers with the A/V call system 120, then the UE 104 in the communications session may be configured to receive indication of the other UE 104 registering with the A/V call system 120 and may further be configured to display, or otherwise indicate (e.g., by audio), that the other UE 104 has registered with the A/V call system 120 during the communications session.

The UE 104 may interact with the A/V call system 120 via any suitable communications networks, including the Internet, a local area network (LAN), a wide area network (WAN), or the like. The communications, and the associated data and signals, between the UE 104 and the A/V call system 120 may be routed through one or more entities, such as a WiFi access point (AP), a 4G long-term evolution (LTE) mobile data network, 5G mobile data network, or the like. Regardless of the routing of the communications, the UE 104 and the A/V call system 120 may exchange data to register, initiate a communications session, conduct a communications session, and/or transfer a communications session. In some cases, the A/V call system 120 may be a part of an Internet Protocol Multimedia Subsystem (IMS) 122 that facilitates packet-based communications over wireless or landline infrastructure. In other cases, the A/V call system 120 may be part of any suitable packet-based telecommunications infrastructure.

When a communications session is in progress, such as between UE 104 and UE 112, the user 102 may be presented with an indication of other of his or her UEs 104 that are registered with the A/V call system 120. The communications session may have been initiated by either user 102 or user 110. In other words, user 102 may have been the caller or the callee in the ongoing communications session. The user 102 may select, such as on his or her UE 104, another UE 104 to which to transfer the ongoing communications session. The UE 104, responsive to this user selection, may be configured to request the A/V call system 120 to transfer the ongoing communications session to the other UE 104. At this point, the A/V call system 120 may be configured to include the other UE 104 in the communications session and then disconnect the original UE 104 from the communications session.

The A/V call system 120 may be configured to enable communications sessions between UEs 104, 112 using any suitable protocols. As disclosed herein, the A/V call system 120 may further be configured to indicate to the UEs 104, 112 whether any other UEs 104, 112 have registered with a user account for which another UE may already be registered. In other words, the A/V call system 120 may be configured to send to a UE 104 an indication of all of the UEs 104 that have registered with the same user account. In this way, the A/V call system 120 is able to make each of the UEs 104 aware of other registered UEs 104 with which the user 102 is associated. Thus, the UEs 104 are able to know, and display to the user 102, the other UEs 104 that can be used to conduct a communications session and/or to which a communications session can be transferred.

When the A/V call system 120 receives a request, from a UE 104, to transfer an ongoing communications session to another UE 104, the A/V call system 120 may receive an identifier of the other UE 104. The A/V call system 120 may then add the other UE 104, as identified by its identifier, to the ongoing call session. After the other UE 104 is added to the ongoing call session, the original UE 104 may be disconnected from the call session.

The UE 112, in example embodiments, may be substantially similar to the UE 104. Although not shown here, there may be additional UEs that may be associated with user 110, and user 110 may be able to transfer a communications session in a manner similar to that disclosed for UEs 104. Additionally, although UE 104 may be discussed herein as either a callee UE or a caller UE in particular examples, it should be appreciated that the disclosure contemplates that the UE 104 or the UE 112 can be the caller UE or the callee UE. Furthermore, the mechanism to transfer a communications session, as disclosed herein, may be performed from either a caller UE or a callee UE.

Figure 2:
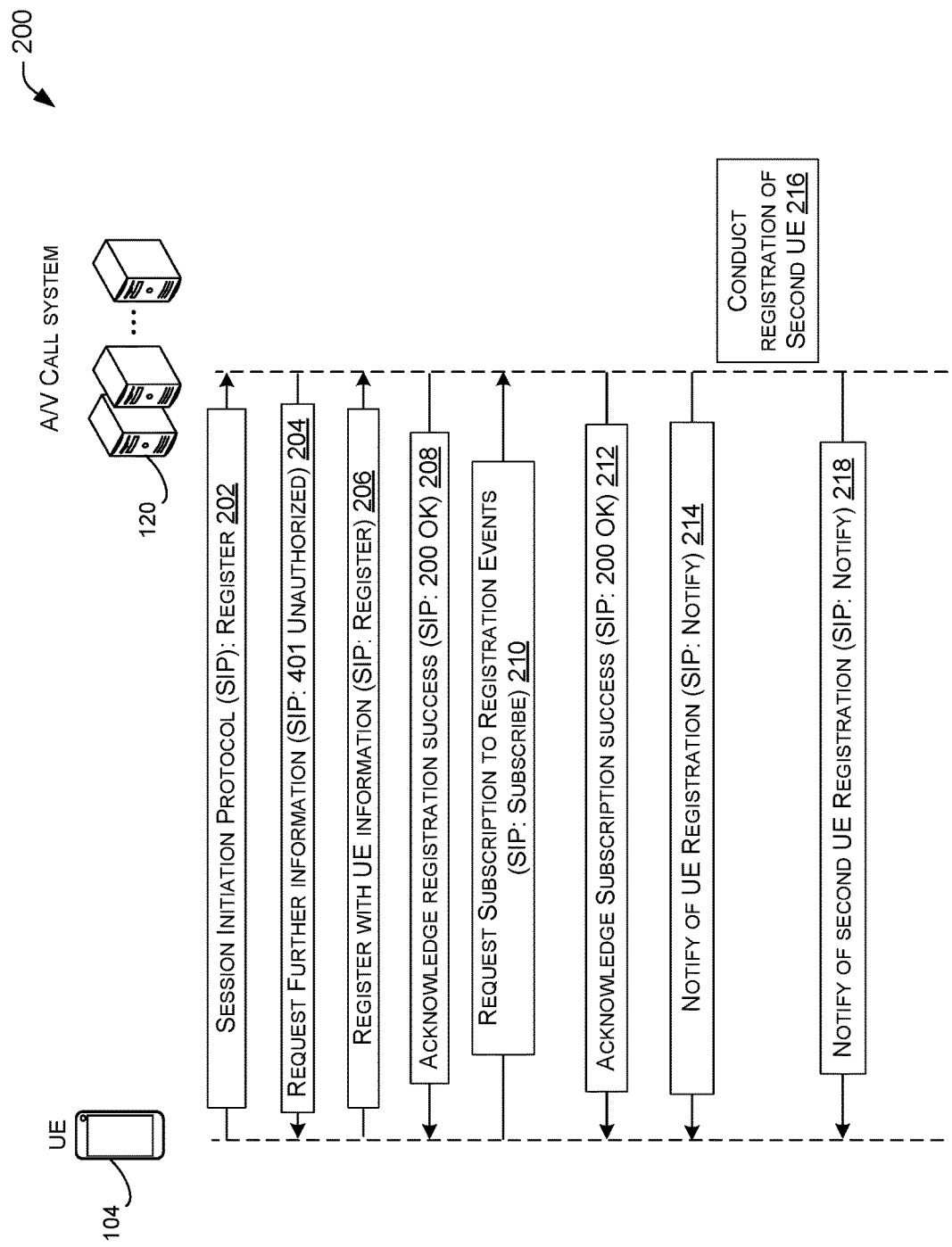
FIG. 2 illustrates a flow diagram of an example method by which user equipment (UE) of a user may be registered with an audio/video (A/V) call system of FIG. 1 and receive registration information of other UEs, in accordance with example embodiments of the disclosure.

FIG. 2 illustrates a flow diagram of an example method 200 by which user equipment (UE) 104 of a user 102 may be registered with an audio/video (A/V) call system 120 of FIG. 1 and receive registration information of other UEs 104, in accordance with example embodiments of the disclosure. The method 200 may be conducted by the UE 104 and the A/V call system 120 in cooperation with one or more other elements of environment 100 of FIG. 1.

At block 202, a session initiation protocol (SIP) message may be sent by the UE 104 to the A/V call system 120 to register on the A/V call system 120. Session initiation protocols (SIPs) may be used for transmitting SIP messages in a signaling portion of a communications session, as opposed to the data or media stream portion of the communications session. Such SIP messages may include, but is not limited to, registration messages, communications session messages, notification messages, acknowledgment messages, and the like. SIP is a signaling protocol that may be used to establish, modify, and terminate communications sessions over packet networks. The SIP control signals may be at an application-layer. This request may, in example embodiments, adhere to Internet Engineering Task Force (IETF) Request For Comment (RFC) 3261 standards.

As used herein, a SIP registration is a message that is sent from a UE 104 to the A/V call system 120 using SIP protocol to register the UE 104 and the communications application operating thereon with the A/V call system 120 to receive and/or initiate communications sessions, such as audio, video, and/or A/V communications sessions. Although described in the context of SIP messaging, it should be understood that any suitable protocols may be used for registering UEs 104 with the A/V call system 120, as described herein.

At block 204, A/V call system 120 may send a request for further information. This request, in some cases, may be in the form of an SIP 401: Unauthorized message. Sending the SIP: 401 may indicate that the A/V call system 120 requires further information, such as authentication credentials, UE name, or the like. Thus, the further information may include authorization credentials for registering with the A/V call system 120, a friendly name of the UE, and/or unique identifiers of the UE.

At block 206, the UE 104 may send information for registering itself with the A/V call system 120. This information may include an identifier of itself, such as a universally unique identifier (UUID), international mobile equipment identity (IMEI), international mobile subscriber identity (IMSI), or other unique UE identifier, identifier of a user account, and/or authentication credentials for registering with the A/V call system 120. The information, in example embodiments, may also include a friendly name (e.g., Bob's mobile phone).

At block 208, the registration success may be acknowledged by the A/V call system 120. The acknowledgement may be by way of the A/V call system 120 sending the UE 104 a SIP: 200 OK message. At block 210, the UE 104 request subscribing to registration events. This subscription may be a request, from the UE 104 to the A/V call system 120, for the A/V call system 120 to inform the UE 104 when another UE 104 associated with the same user 102, as determined by having a common user profile, is registered with the A/V call system 120.

At block 212, the A/V call system 120 may acknowledge the UE 104 being subscribed to receive registration events. This acknowledgement may, in example embodiments, be in the form of a SIP: 200 OK message. At block 214, the A/V call system 120 may notify the UE 104 of the UE's registration. This notification may be sent due to the UE 104 subscribing to registration events, which in this case may include its own registration with the A/V call system 120.

At block 216, another UE 104 may optionally register with the A/V call system 120. This process may be similar to the operations of blocks 202-214, as described above. The second UE 104 may register with the A/V call system 120 as associated with the same user 102 as the UE 104. As a result, and because the first UE 104 is subscribed to receive notification of registration events, at block 218, the A/V call system 120 may notify the UE 104 of the second UE being registered with the A/V call system 120.

Figure 3A:
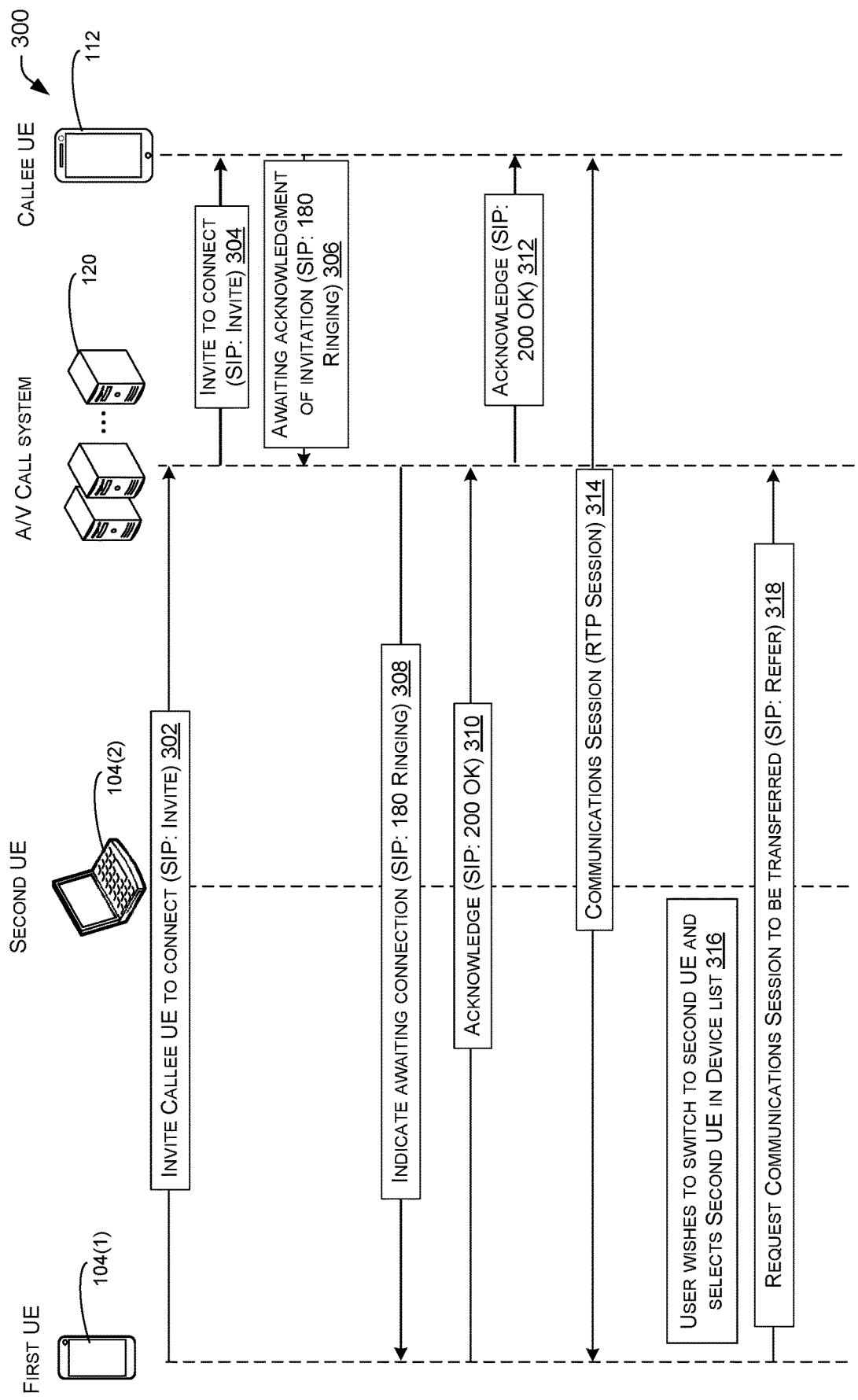
FIGS. 3A and 3B illustrate a flow diagram of an example method by which a communications session may be switched from a first UE to a second UE while the communications session is in progress, in accordance with example embodiments of the disclosure.
Figure 3B:
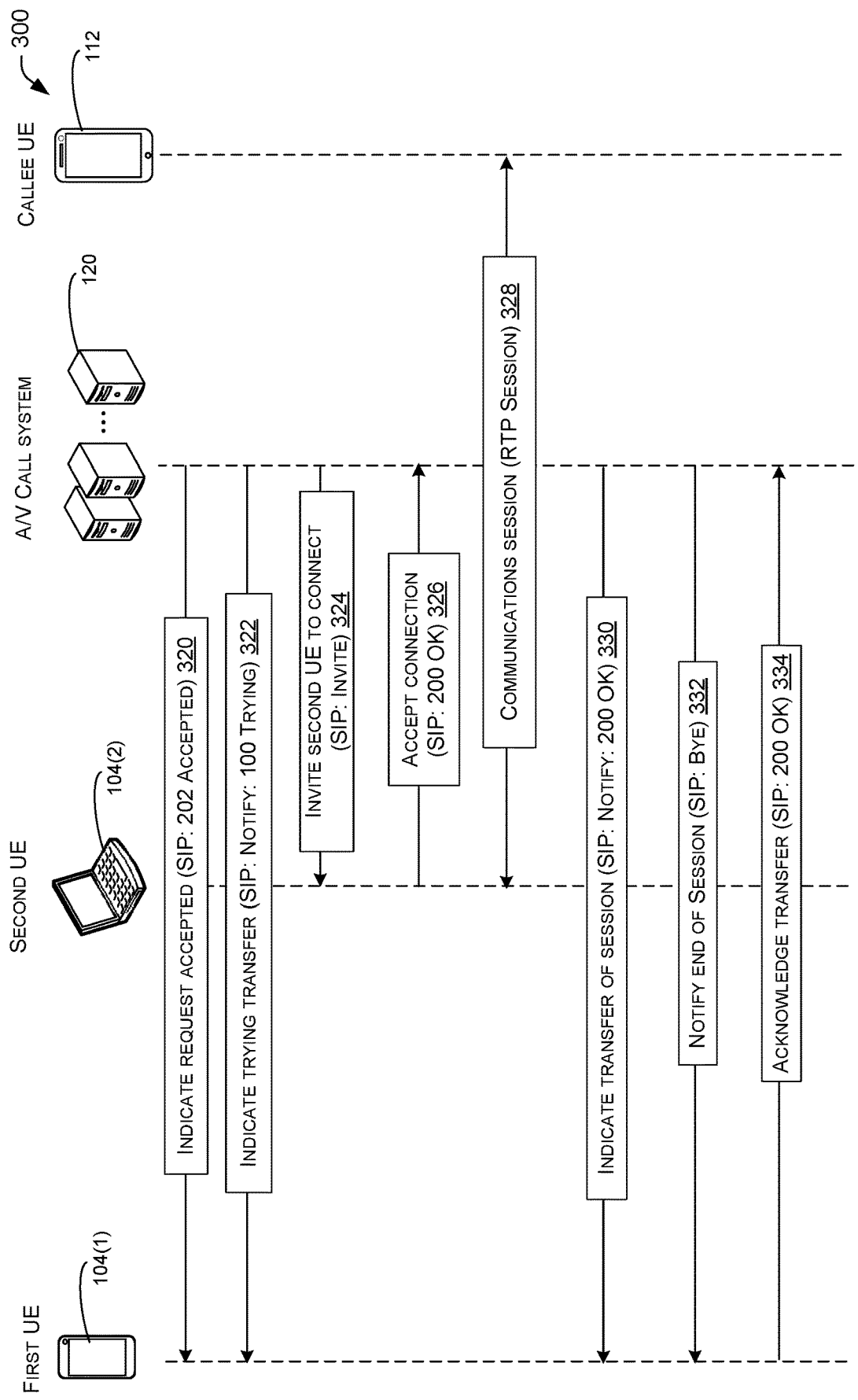

FIGS. 3A and 3B illustrate a flow diagram of an example method 300 by which a communications session may be switched from a first UE 104 to a second UE 104 while the communications session is in progress, in accordance with example embodiments of the disclosure. Method 300 may be performed as an interaction between a first UE 104(1), a second UE 104(2), the A/V call system 120, UE 112, and callee UE 112. Although method 300 depicts a first UE 104(1) as the caller UE and the UE 112 as a callee UE 112, it should be understood that the communications session transfer mechanism is similar regardless of which UE 104, 112 is the caller or callee. Indeed, according to example embodiments, the UE 112 may be the entity that initiates a communications session.

At block 302, the first UE 104(1) may invite the callee UE 112 to connect by sending an invitation for the connection to the A/V call system 120. This invitation, in example embodiments, may be in the form of a SIP: Invite. The invitation may be prompted on the first UE 104(1) by user input. For example, user 102 may select "Call Jim," such as on a GUI displayed on the first UE 104(1) as displayed by operating the communications application by the first UE 104(1), to prompt the invitation to be sent by the first UE 104(1) to the A/V call system 120. The invitation may include an identifier of the callee, such as a user account, user name, UUID, IMEI, IMSI, or any other suitable identifier of the callee UE 112 and/or the associated user 110.

At block 304, the A/V call system 120 may send an invite to connect to the callee UE 112. This invite, in example embodiments, may be a SIP: Invite message. In some cases, this invite may be a rerouting, by the A/V call system 120, of the invite received by the A/V call system 120 from the first UE 104(1). In other cases, the A/V call system 120 may generate a new invite based at least in part on the invite received from the first UE 104(1). In some cases, the invite to be sent to the callee UE 112 may be the receive invite from the first UE 104(1) with one or more data elements added and/or removed therefrom.

At block 306, the callee UE 112 may send an indication that it is awaiting acknowledgement of the invitation. This may, in example embodiments, be a SIP: 180 Ringing message. This message of awaiting acknowledgment may indicate that the callee UE 112 has indicated to its user 110 that there is an invitation to connect to a communications session, but is awaiting user input from its user 110 that he or she wishes to engage in the invited communications session. At block 308, the A/V call system 120 may indicate to the first UE 104(1) that the callee UE 112 is awaiting its user 110 to accept the invitation for the communications session. The first UE 104(1) may optionally indicate to its user 102 that the invitation to connect to a communications session is awaiting acceptance by the user 110.

At block 310, the first UE 104(1) may send an acknowledgment that it received notification of the UE 112 awaiting acceptance of the invitation. This acknowledgment, in example embodiments, may be in the form of a SIP: 200 OK message. At block 312, the A/V call system 120 may send an acknowledgement to the callee UE 112. This acknowledgement, in example embodiments, may be the acknowledgment of block 310 redirected by the A/V call system 120 to the callee UE 112. In other cases, the acknowledgement may be generated by the A/V call system 120 based at least in part on the acknowledgement received from the first UE 104(1) at block 310. In either case, the acknowledgment may indicate to the callee UE 112 that the first UE 104(1) is aware that the callee UE 112 is awaiting its user 110 to accept the invitation to a communications session. The acknowledgement, in example embodiments, may be in the form of an SIP: 200 OK message.

At block 314, the communications session between the first UE 104(1) and the callee UE 112 may be established. This may be a real-time transport protocol (RTP) session, or alternatively, any suitable communications session protocol that can enable a communications session, such as an audio call, a video call, and/or an A/V call.

At block 316, the user 102 of the first UE 104(1) may choose a second UE 104(2) to transfer the ongoing communications session to, as established at block 314. The first UE 104(1) may display to the user 102 one or more other UEs 104 to which the user 102 may switch his or her communications session, such as by the method 200 and the mechanisms discussed in conjunction with FIG. 2 herein. The user 102 may select the second UE 104(2) to transfer the communications session to, such as by interacting with an interface, such as a GUI, on the first UE 104(1).

At block 318, the first UE 104(1) may send a request to the A/V call system 120 that the communications session be transferred to the second UE 104(2). This request, in example embodiments, may be in the form of a SIP: Refer message. This request may be responsive to the first UE 104(1) receiving an indication, such as from the user 102, that the communications session is to be transferred to the second UE 104(2).

At block 320, the A/V call system 120, responsive to receiving the request to transfer the session, may send, to the first UE 104(1), an indication that the request is accepted. In some cases, the A/V call system 120 may confirm that the second UE 104(2) is registered and/or eligible to have the session transferred thereon prior to sending the indication that the request to transfer is accepted. This indication, in example embodiments, may be in the form of a SIP: 202 Accepted message.

At block 322, the A/V call system 120 may send, to the first UE 104(1), an indication that it is trying to transfer the session. This may be an indication that the A/V call system 120 may soon attempt the process of connecting the communications session to the second UE 104(2). This indication of trying to transfer the communications session, in example embodiments, may be in the form of a SIP: 100 Trying message. At block 324, the A/V call system 120 may invite the second UE 104(2) to connect to the communications session. This invite, in example embodiments, may be similar to the invite of block 304, and in some cases may be in the form of a SIP: Invite message.

At block 326, the second UE 104(2) may accept the invitation to join the communications session. This acceptance, in example embodiments, may be in the form of a SIP: 200 OK message. In some cases, the second UE 104(2) may automatically accept the invitation to join the communications session. In other cases, the user 102 may have to accept the invitation to join the communications session, such as by user input on the second UE 104(2). At block 328, the communications session between the second UE 104(2) and the callee UE 112 may be established. This may include a RTP session, or alternatively, any suitable communications session protocol that can enable a communications session, such as an audio call, a video call, and/or an A/V call.

At block 330, the A/V call system 120 may indicate to the first UE 104(1) that the session has been transferred to the second UE 104(2). This indication, in example embodiments, may be in the form of a SIP: 200 OK message. At block, 332, the A/V call system 120 may notify the end of the session with the first UE 104(1). This notification, in example embodiments, may be in the form of a SIP: Bye message. At block 334, the first UE 104(1) may acknowledge transfer the communications session. This acknowledgement, in example embodiments, may be in the form of a SIP: 200 OK message.

It should be noted that some of the operations of method 300 may be performed out of the order presented, with additional elements, and/or without some elements. Some of the operations of method 300 may further take place substantially concurrently and, therefore, may conclude in an order different from the order of operations shown above. It should also be noted that in some cases, there may be other components of the environment 100 involved in one or more of the operations, as described herein.

Figure 4:
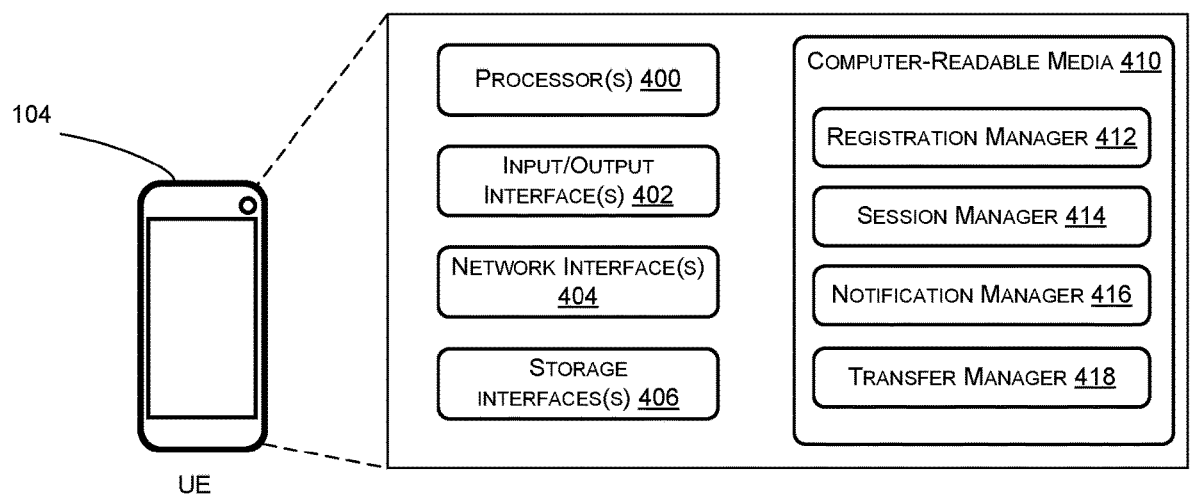
FIG. 4 illustrates a block diagram of an example user equipment (UE) from which a communications session may be conducted and enables switching to and/or switching from an ongoing communications session, in accordance with example embodiments of the disclosure.

FIG. 4 illustrates a block diagram of an example user equipment (UE) 104, 112 from which a communications session may be conducted and enables switching to and/or switching from an ongoing communications session, in accordance with example embodiments of the disclosure.

In accordance with various embodiments disclosed herein, the terms user equipment (UE), communication device, device, wireless communication device, wireless device, mobile device, terminal, wireless terminal, mobile terminal, and client device, may be used interchangeably herein to describe the UE 104 or UE 112. The UE 104, 112 may be configured for transmitting/receiving data, wirelessly and/or over wired networks, using any suitable communications/data technology, protocol, or standard, such as Global System for Mobile Communications (GSM), Time Division Multiple Access (TDMA), Universal Mobile Telecommunications System (UMTS), Evolution-Data Optimized (EVDO), Long Term Evolution (LTE), Advanced LTE (LTE+), Generic Access Network (GAN), Unlicensed Mobile Access (UMA), Code Division Multiple Access (CDMA), Orthogonal Frequency Division Multiple Access (OFDM), General Packet Radio Service (GPRS), Enhanced Data GSM Environment (EDGE), Advanced Mobile Phone System (AMPS), High Speed Packet Access (HSPA), evolved HSPA (HSPA+), Voice over IP (VoIP), Voice over LTE (VoLTE), IEEE 802.1x protocols, WiMAX, Wi-Fi, Data Over Cable Service Interface Specification (DOCSIS), digital subscriber line (DSL), and/or any future IP-based network technology or evolution of an existing IP-based network technology.

The UE 104 may include one or more processor(s) 400, one or more input/output (I/O) interface(s) 402, one or more network interface(s) 404, one or more storage interface(s) 406, and computer-readable media 410.

In some implementations, the processors(s) 400 may include a central processing unit (CPU), a graphics processing unit (GPU), both CPU and GPU, a microprocessor, a digital signal processor or other processing units or components known in the art. Alternatively, or in addition, the functionally described herein can be performed, at least in part, by one or more hardware logic components. For example, and without limitation, illustrative types of hardware logic components that may be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, each of the processor(s) 400 may possess its own local memory, which also may store programs, program data, and/or one or more operating systems. The one or more processor(s) 400 may include one or more cores.

The one or more input/output (I/O) interface(s) 402 may enable the UE 104 to detect interaction with a user 102 and/or other UEs 104, 112. The I/O interface(s) 402 may include a combination of hardware, software, and/or firmware and may include software drivers for enabling the operation of any variety of I/O device(s) integrated on the UE 104 or with which the UE 104 interacts, such as displays, microphones, speakers, cameras, switches, and any other variety of sensors, or the like. In example embodiments, the I/O devices of the UE 104 may include microelectromechanical system (MEMS) devices, such as accelerometers or other sensors that may provide positional and/or location information of the UE 104.

The network interface(s) 404 may enable the UE 104 to communicate via the one or more network(s). The network interface(s) 404 may include a combination of hardware, software, and/or firmware and may include software drivers for enabling any variety of protocol-based communications, and any variety of wireline and/or wireless ports/antennas. For example, the network interface(s) 404 may comprise one or more of a cellular radio, a wireless (e.g., IEEE 802.1x-based) interface, a Bluetooth® interface, and the like. In some embodiments, the network interface(s) 404 may include radio frequency (RF) circuitry that allows the UE 104 to transition between various standards. The network interface(s) 404 may further enable the UE 104 to communicate over circuit-switch domains and/or packet-switch domains.

The storage interface(s) 406 may enable the processor(s) 400 to interface and exchange data with the computer-readable medium 410, as well as any storage device(s) external to the UE 104. The storage interface(s) 406 may further enable access to removable media, such as a subscriber identification module (SIM) card of the UE 104.

The computer-readable media 410 may include volatile and/or nonvolatile memory, removable and non-removable media implemented in any method or technology for storage of information, such as computer-readable instructions, data structures, programs, or other data. Such memory includes, but is not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, RAID storage systems, or any other medium which can be used to store the desired information and which can be accessed by a computing device. The computer-readable media 410 may be implemented as computer-readable storage media (CRSM), which may be any available physical media accessible by the processor(s) 400 to execute instructions stored on the memory 410. In one basic implementation, CRSM may include random access memory (RAM) and Flash memory. In other implementations, CRSM may include, but is not limited to, read-only memory (ROM), electrically erasable programmable read-only memory (EEPROM), or any other tangible medium which can be used to store the desired information and which can be accessed by the processor(s) 400. The computer-readable media 410 may have an operating system (OS) and/or a variety of suitable applications stored thereon. The OS, when executed by the processor(s) 400 may enable management of hardware and/or software resources of the UE 104.

Several components such as instruction, data stores, and so forth may be stored within the computer-readable media 410 and configured to execute on the processor(s) 400. The computer readable media 410 may have stored thereon a registration manager 412, a session manager 414, a notification manager 416, and a transfer manager 418. It will be appreciated that each of the components 412, 414, 416, 418, may have instructions stored thereon that when executed by the processor(s) 400 may enable various functions pertaining to the operations of the UE 104.

The instructions stored in the registration manager 412, when executed by the processor(s) 400, may configure the UE 104 to interact with the A/V call system(s) 120 to get registered. This may entail sending information back and/or forth with UEs 104, 112 to register the UEs 104, 112 to enable their respective users 102, 110 to use the services on the A/V call system(s) 120. In example, embodiments, the registration process may entail logging into the A/V call system(s) 120 with a user account of a user 102, 110. The UE 104 may send login authentication credentials (login, password, authentication certificates, etc.) to login to the A/V call system(s) 120.

The instructions stored in the session manager 414, when executed by the processor(s) 400, may configure the UE 104 to initiate, receive, and/or transfer a communications session. The UE 104 may be configured to conduct a communications session using packetized transfer of data with another UE 110. The UE 104 may also be configured to receive user inputs, such as an input to request the transfer of a communications session. This input may be via any suitable I/O interface, such as a touch screen, for example. The session manager 414 may also have instructions stored thereupon that enables the UE 104 to initiate, accept, reject, and/or terminate a communications session responsive to user input. The UE 104 may be configured to exchange one or more control messages with the A/V call system 120, as described herein to affect the aforementioned functions.

The instructions stored in the notification manager 416, when executed by the processor(s) 400, may configure the UE 104 to subscribe to receive registration event notifications and indicate to a user the availability of other UEs 104 to which a communications session may be transferred. The subscription to the registration event notifications may be requested to the A/V call system 120 after the UE 104 itself registers. This registration may allow the UE 104 to receive notifications of other UE 104 that have registered with the A/V call system 120 using a common user account. When the UE 104 receives an indication of another UE 104 registering with a common user account, the UE 104 may indicate, to the user 102, the availability of the other UE 104 to receive, initiate, and/or transfer a communications session. In example embodiments, the UE 104 may be configured to receive a registration event notification even when the UE 104 may be engaged in a communications session. In this case, when the registration event is notified, the UE 104 may be configured to indicate to its user 102 that the new UE 104 is available and that the current communications session may be transferred to that UE 104.

The instructions stored in the transfer manager 418, when executed by the processor(s) 400, may configure the UE 104 to cooperate with the A/V call system 120 to transfer a communications session from the UE 104 to another UE 104 that is registered with the A/V call system 120 using a common user account or is otherwise associated with the same user 102. This transfer of the communications session may entail sending the A/V call system 120 an indication of the other UE 104 to which the communications session is to be transferred. THE UE 104 may also receive an indication that the other UE 104 has been added to the communications session and may then disengage from the communications session.

Figure 5:
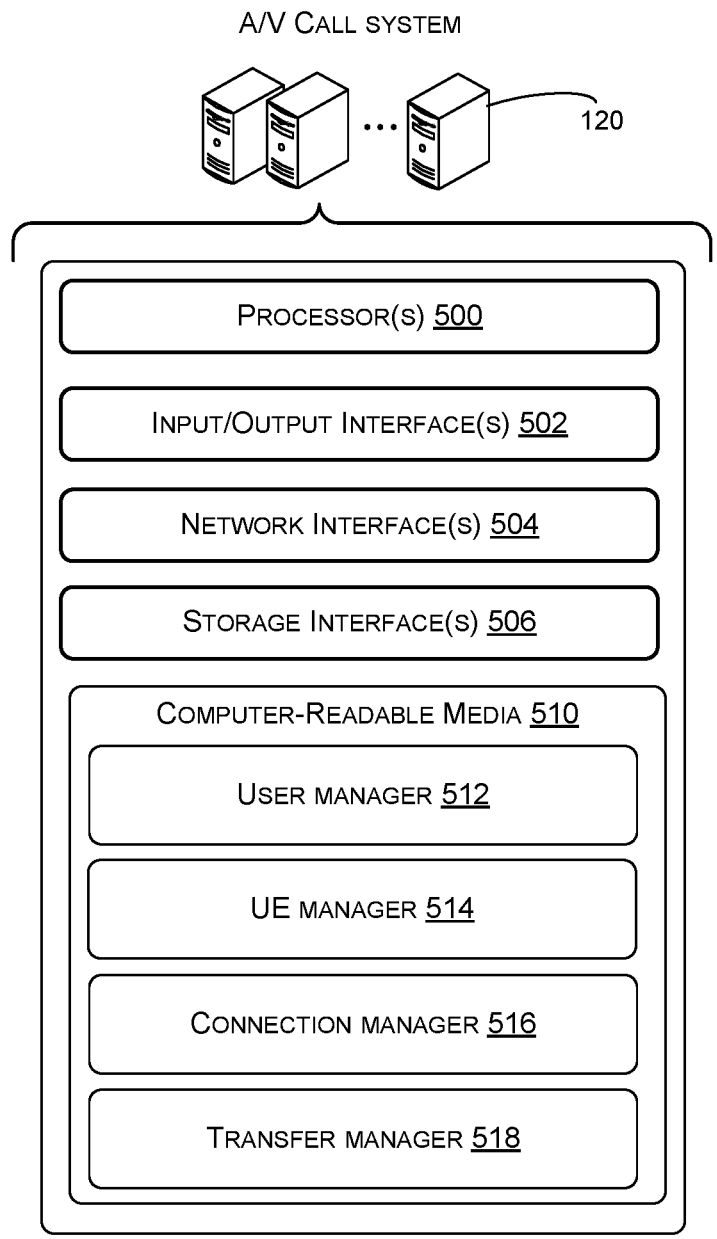
FIG. 5 illustrates a block diagram of an example A/V call system that may provide communications services and the ability to switch UEs during a communications session, in accordance with example embodiments of the disclosure.

FIG. 5 illustrates a block diagram of an example A/V call system 120 that may provide communications services and the ability to switch UEs 104 during a communications session, in accordance with example embodiments of the disclosure.

The A/V call system 120 may include one or more processor(s) 500, one or more input/output (I/O) interface(s) 502, one or more communication interface(s) 504, one or more storage interface(s) 506, and computer-readable media 510. The descriptions of the one or more processor(s) 500, the one or more input/output (I/O) interface(s) 502, the one or more network interface(s) 504, the one or more storage interface(s) 506, and the computer-readable media 510 may be substantially similar to the descriptions of the one or more processor(s) 400, the one or more input/output (I/O) interface(s) 402, the one or more network interface(s) 404, the one or more storage interface(s) 406, and the computer-readable media 410, respectively, as described in FIG. 4 with respect to the UE 104, and in the interest of brevity, will not be repeated here.

Several components such as instruction, data stores, and so forth may be stored within the computer-readable media 510 and configured to execute on the processor(s) 500. The computer readable media 510 may have stored thereon a user manager 512, UE manager 514, a connection manager 516, and a transfer manager 518. It will be appreciated that each of the components 512, 514, 516, 518, 520, 522 may have instructions stored thereon that when executed by the processor(s) 500 may enable various functions pertaining to conducting and transferring communications sessions between UEs 104.

The instructions stored in the user manager 512, when executed by the processor(s) 500, may configure the A/V call system 120 to intake new users 102, 110 to use the services of the A/V call system 120. This may entail user account setup, as well as setting up authentication credentials and access credentials to the A/V call system 120.

The instructions stored in the UE manager 514, when executed by the processor(s) 500, may configure the A/V call system 120 to register one or more UEs 104, 112. This may entail sending information back and/or forth with UEs 104, 112 to register the UEs 104, 112 to enable their respective users 102, 110 to use the services on the A/V call system(s) 120. The A/V call system 120 may further be configured to generate and send registration event notifications, such as a notification to a UE 104 when another UE 104 registers with the A/V call system 120 using the same user account and/or is otherwise associated with the same user 102.

The instructions stored in the connection manager 516, when executed by the processor(s) 500, may configure the A/V call system 120 to enable a communications session between two or more UEs 104, 112. The A/V call system 120 may be configured to enable a communications session via any suitable protocol, such as real-time transport protocol (RTP).

The instructions stored in the transfer manager 518, when executed by the processor(s) 500, may configure the A/V call system 120 to transfer a communications session from one UE 104 to another UE 104 associated with the same user 102 in a seamless manner. This transfer may be made without any interruptions to the current communications session and/or without the other participants 110 of the communications session knowing of the transfer. The A/V call system 120 may be configured to receive a request from a first UE 104 to transfer the current communications session in which it is engaged to a second UE 104. In some cases, the A/V call system 120 may verify whether the second UE 104 is currently registered with the A/V call system 120 using the same user account. If the first UE 104 and he second UE 104 are associated with the same user 102, then the A/V call system 120 may interact with the second UE 104 to include the second UE 104 into the communications session. When the second UE 104 is joined in the communications session, the A/V call system 120 is configured to instruct the first UE 104 to disconnect from the communications session.

Figure 6:
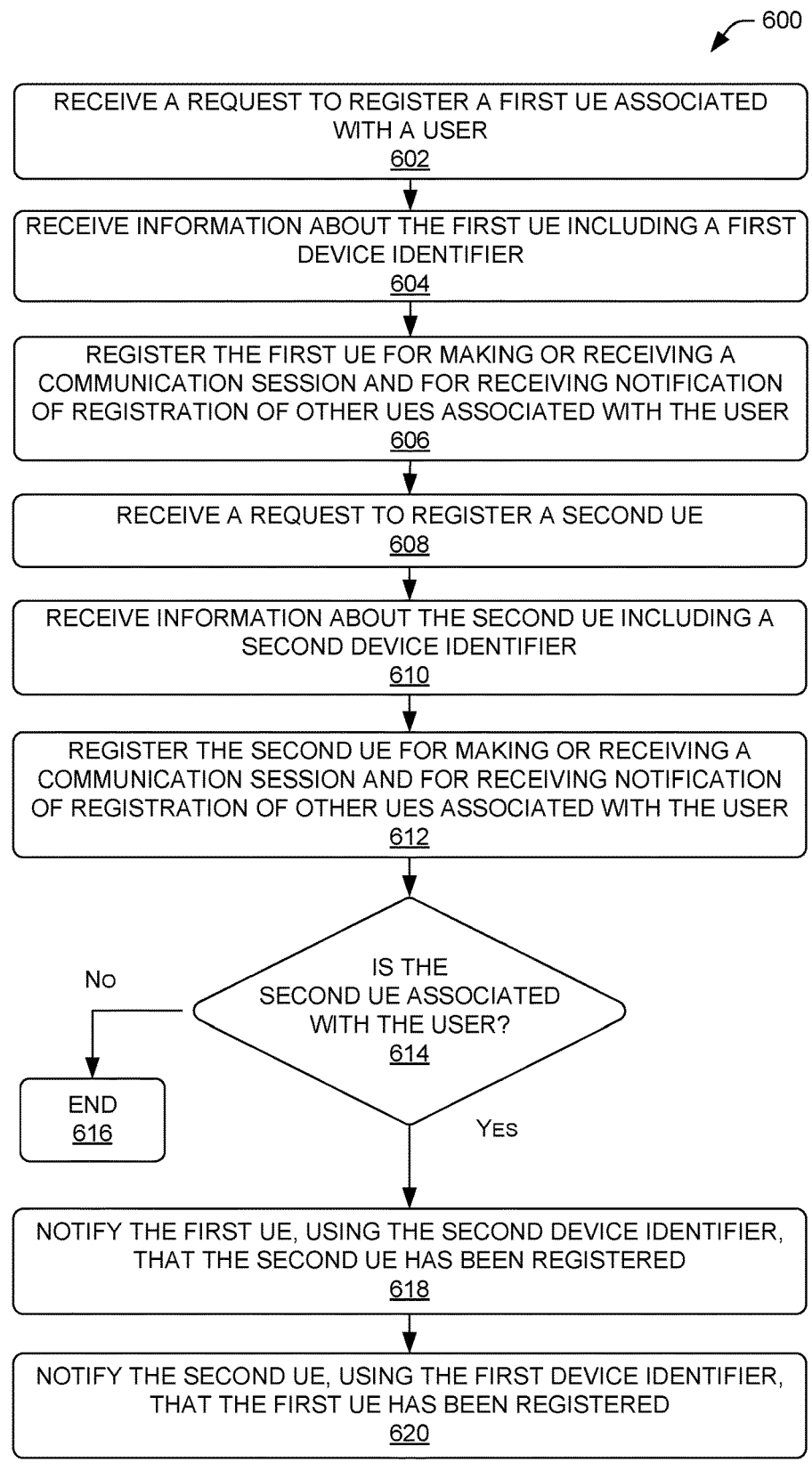
FIG. 6 illustrates a flow diagram of an example method by which a first UE registration is reported to a second UE and the second UE registration is reported to the first UE, in accordance with example embodiments of the disclosure.

FIG. 6 illustrates a flow diagram of an example method 600 by which a first UE registration is reported to a second UE and the second UE registration is reported to the first UE, in accordance with example embodiments of the disclosure. Method 600 may be performed by the A/V call system 120 in cooperation with one or more other entities of environment 100.

At block 602, a request to register a first UE 104 associated with a user 102 may be received. This registration process may be initiated by a request to register as received from the first UE 104 running a communications session application. This request may, in some cases, be a SIP: register message. At this point additional information may be needed to register the first UE 104. In some cases, a request may be made to solicit the information needed to register the first UE 104.

At block 604, information about the first UE 104, including a first device identifier, may be received. In some cases, this information may include authentication credentials, such as a login, password, UUID, IMEI, IMSI, authentication certificates, combinations thereof, or the like. This information, in example embodiments, may also include a friendly name (e.g., Rob's IPHONE).

At block 606, the first UE 104 may be registered for making or receiving a communications session and for receiving notification of registration of other UEs 104 associated with the user 102. In other words, the first UE 104 may be subscribed to receive notifications of other UEs 104 that may be registered with the A/V call system 120 using the user account or otherwise associated with the same user 102.

At block 608, a request to register a second UE 104 may be received. This operation may be substantially similar to the operations of block 602. At block 610, information about the second UE 104 may be received. This information, similar to the operations of block 604, may include an identifier of the second UE (e.g., UUID) and/or a friendly name of the second UE (e.g., Rob's Laptop).

At block 612, the second UE 104 may be registered for making or receiving a communications session and for receiving notification of registration of other UEs 104 associated with its user. Again, this may entail the A/V call system 120 notifying the second UE 104 of other UEs 104 that may be registered with the A/V call system 120 using the same user account information. In example embodiments, these notifications may occur even when the second UE 104 and/or the first UE 104 may be engaged in a communications session.

At block 614, it may be determined if the second UE 104 is associated with the user 102. In other words, it may be determined if the second UE 104 is registered in association with the same user 102 as for the first UE 104. If it is determined that the second UE 104 is not associated with the same user as the first UE 104, then at block 616, the method 600 may end. On the other hand, if it is determined that the second UE 104 and the first UE 104 are registered in association with the same user 102, then the method 600 may advance to block 616, where the first UE 104 is notified that the second UE 104 has been registered. At block 618, the second UE 104 may also be notified that the first UE 104 is registered. The notifications of blocks 616 and 618 may be based at least in part on the first UE 104 and the second UE 104 subscribing to registration event notifications of other UEs 104 that register with the A/V call system 120 using the same user account.

Figure 7:
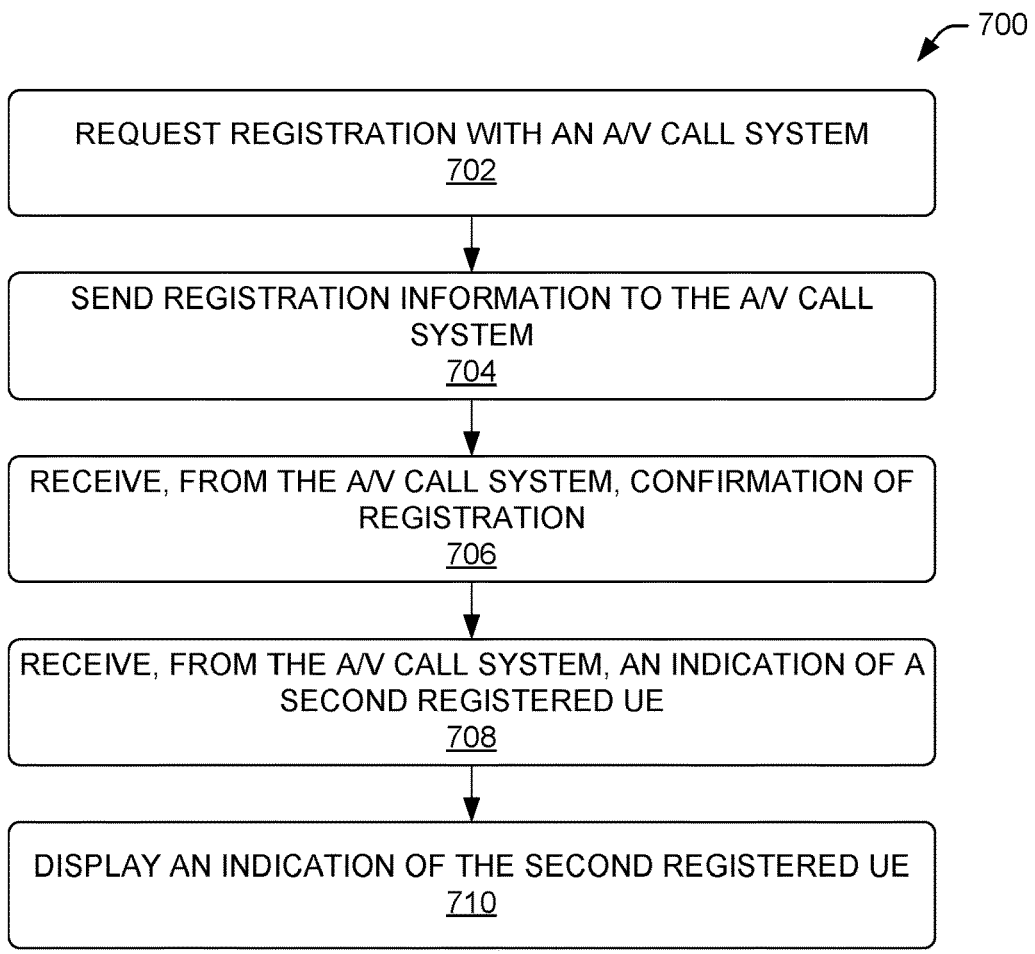
FIG. 7 illustrates a flow diagram of an example method for receiving a notification of a second UE being registered with an A/V call system and displaying the indication, in accordance with example embodiments of the disclosure.

FIG. 7 illustrates a flow diagram of an example method 700 for receiving a notification of a second UE 104 being registered with an A/V call system 120 and displaying the indication, in accordance with example embodiments of the disclosure. Method 700 may be performed by a first UE in cooperation with one or more other elements of environment 100.

At block 702, registration with an A/V call system 120 may be requested. A SIP registration message may be sent to the A/V call system 120 using SIP protocol to register the UE 104 and the communications application operating thereon with the A/V call system 120 to receive and/or initiate communications sessions. Although described in the context of SIP messaging, it should be understood that any suitable protocols may be used for registering UEs 104 with the A/V call system 120, as described herein. A request for subscribing to registration events may also be sent in addition to or as part of the registration with the A/V call system 120. This subscription may be a request to the A/V call system 120 send a notification when another UE 104 associated with the same user 102, as determined by having a common user profile, is registered with the A/V call system 120.

At block 704, registration information may be sent to the A/V call system. In some cases, this information may include authentication credentials, such as a login, password, UUID, IMEI, IMSI, authentication certificates, combinations thereof, or the like. This information, in example embodiments, may also include a friendly name of the UE. In some cases, this sending of registration information may be prompted by the A/V call system 120 requesting further information and/or notifying the UE 104 that it is unauthorized (e.g., registration information has not yet been provided).

At block 706, confirmation of the registration may be received from the A/V call system 120. In some cases, the received confirmation may be an acknowledgement of the registration at the A/V call system 120. In example embodiments, this acknowledgment may be in the form of a SIP: 200 OK message. At block 708, an indication of a second registered UE 104 may be received. The second UE 104 may register with the A/V call system 120 as associated with a common user 102. Since registration events of a common user 102 are to be notified, the notification of the second UE 104 having registered is received from the A/V call system 120. This notification may include the second UE's unique identifier (e.g., UUID), the second UE's device type, the second UE's friendly name, or any other suitable information about the second UE 104.

At block 710, an indication of the second registered UE 104 may be displayed. This may be displayed on any suitable I/O interface, such as a display screen or touch sensitive display screen. Alternatively, other mechanisms may be used to indicate the registration of the second UE, for example as audio form a speaker. In some cases, the second UE 104 being registered with the A/V call system 120 may be displayed along with one or more other UEs 104 that may also be registered with the A/V call system 120 with a common user 102. This may allow a user 102 to see which one of his or her UEs 104 are available for the purposes of engaging in a communications session. In some cases, the second UE 104 may be displayed by its friendly name or a variation thereof (e.g., Jim's Tablet, or Your Tablet, etc.). In some example embodiments, when a communications session is already underway, the registration of the second UE 104 may be displayed as an option to which the communications session may be transferred (e.g., Transfer A/V call to Your Tablet).

Figure 8:
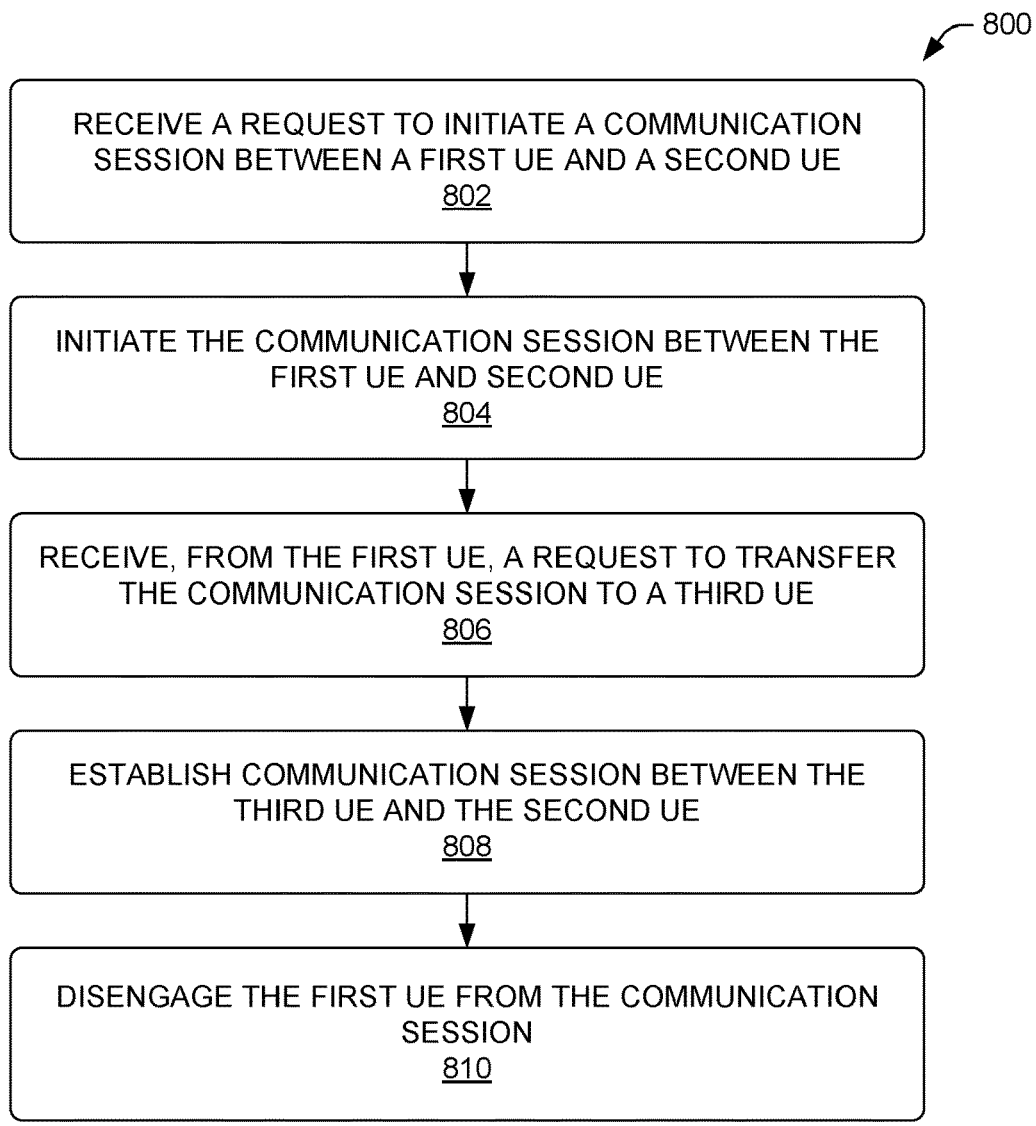
FIG. 8 illustrates a flow diagram of an example method for transferring a communications session from one UE to another UE, in accordance with example embodiments of the disclosure.

FIG. 8 illustrates a flow diagram of an example method 800 for transferring a communications session from one UE 104 to another UE 104, in accordance with example embodiments of the disclosure. Method 800 may be performed by the A/V call system 120 in cooperation with one or more other entities of environment 100.

At block 802, a request to initiate a communications session between a first UE 104 and a second UE 112 may be received. In some cases, one of the UEs 104, 112 (e.g., the caller) may invite the other UE 112, 104 (e.g., the callee) to engage in the communications session. This invitation, in example embodiments, may be in the form of a SIP: Invite. The invitation may be prompted on one of the UEs 104, 112 by user input.

At block 804, the communications session between the first UE 104 and the second UE 112 may be initiated. This process may include the various interactions and handshaking protocols as described in conjunction with FIGS. 3A and 3B. At a minimum, both the UEs 104, 112 may be registered with the A/V call system 120 and have the communications application operating thereon to engage in the communications session.

At block 806, a request may be received, from the first UE 104, to transfer the communications session to a third UE 104. This request, in example embodiments, may be prompted by user input to the first UE 104. For example, the first UE 104 may indicate on a display other UEs 104 to which the user 102 may transfer his or her communications session, such as by the operations described in conjunction with FIG. 7. The user may select the third UE 104 from among his or her UEs 104 that are registered with the A/V call system 120 and ready to have the communications session transferred thereon.

At block 808, communications session may be established between the third UE 104 and the second UE 112. In example embodiments, this may entail adding the third UE 104 to the ongoing communications session between the first UE 104 and the second UE 112. In example embodiments, an invite, such as in the form of a SIP: Invite message, may be sent to the third UE 104. In some cases, the third UE 104 may automatically accept the invitation to join the communications session. In other cases, the user 102 may have to accept the invitation to join the communications session, such as by user input on the third UE 104. This may be a RTP session, or alternatively, any suitable communications session protocol that can enable a communications session, such as an audio call, a video call, and/or an A/V call.

At block 810, the first UE 104 may be disengaged from the communications session. In some cases, an indication may be sent to the first UE 104 that the session has been transferred to the third UE 104. This indication, in example embodiments, may be in the form of a SIP: 200 OK message. In example embodiments, this instruction to disengage from the communications session may be in the form of a SIP: Bye message. Optionally, an acknowledgment of the transfer the communications session, such as in the form of a SIP: 200 OK message, may be received from the first UE 104.

Figure 9:
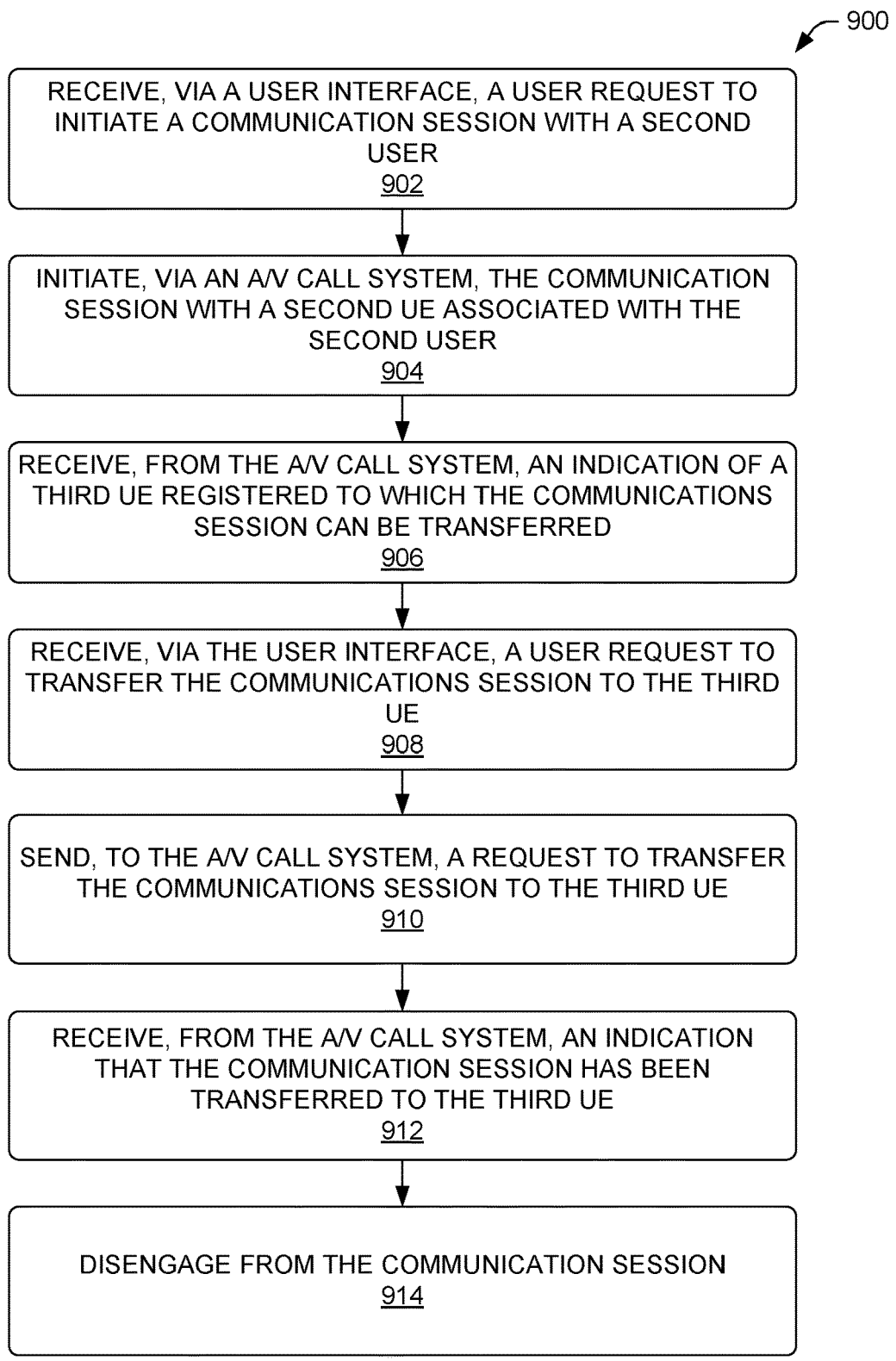
FIG. 9 illustrates a flow diagram of an example method for receiving user input to transfer a communications session and transferring the communications session to another UE associated with the user, in accordance with example embodiments of the disclosure.

FIG. 9 illustrates a flow diagram of an example method 900 for receiving user input to transfer a communications session and transferring the communications session to another UE 104 associated with the user 102, in accordance with example embodiments of the disclosure. Method 900 may be performed by the UE 104 in cooperation with other entities of environment 100.

At block 902, a user request to initiate a communications session with a second user 110 may be received via a user interface. In some cases, the user interface may be a GUI displayed by the UE 104. A user 102 may select, for example, the second user 110 from a list of his or her contacts to engage in a communications session.

At block 904, the communications session may be initiated, via an A/V call system 120, with a second UE 112 associated with the second user 110. This may be a RTP session, or alternatively, any suitable communications session protocol that can enable a communications session, such as an audio call, a video call, and/or an A/V call.

At block 906, an indication received of a third registered UE 104 to which the communications session can be transferred. A previous subscription with the A/V call system to receive registration event notifications may enable receiving this notification of the third UE 104. The third UE 104 may be registered with the A/V call system using a common user account.

At block 908, a user request to transfer the communications session to the third UE 104 may be received via the user interface. This may be by way of a user selection that indicates that the communications session is to be transferred to the third UE 104. For example, a user 102 may select an icon for transferring the communications session to the third UE 104 on a touch sensitive display screen.

At block 910, a request may be sent to the A/V call system 120 to transfer the communications session to the third UE 104. This request may be in any suitable form and may indicate identifying information (e.g., UUID) of the third UE 104. In some example embodiments, this request may be in the form of a SIP: Refer message generated and sent to the A/V call system.

At block 912, an indication that the communications session has been transferred to the third UE 104 may be received from the A/V call system 120. In some cases, this may be in the form of a SIP: Notify: 200 OK message. Optionally, the transfer being completed may be displayed to the user 102 such as on a display screen. At block 914, the first UE 104 may disengage from the communications session. In some cases, the disengagement may be after receiving a SIP: Bye message from the A/V call system 120.

Figure 10:
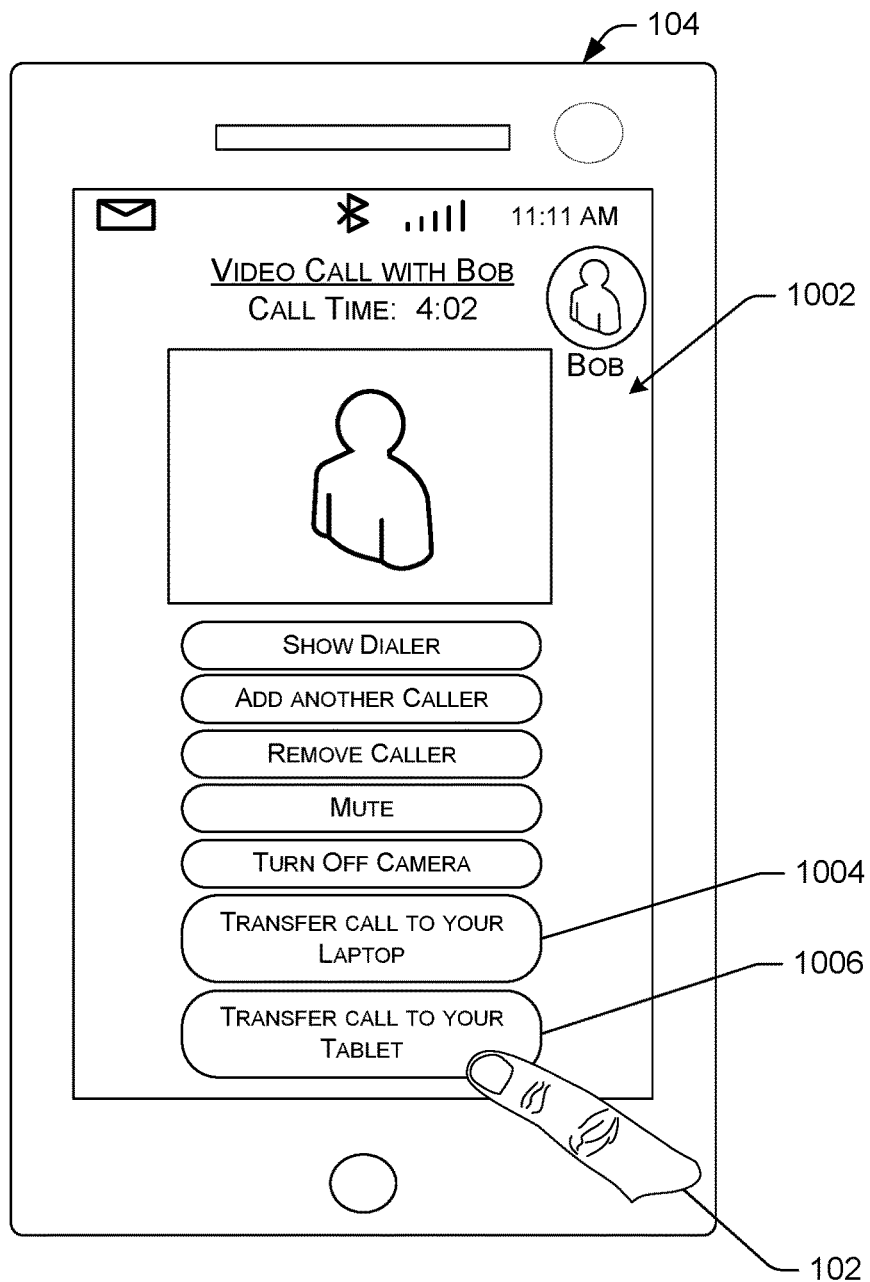
FIG. 10 illustrates a schematic diagram of an example UE from which a communications session may be transferred, in accordance with example embodiments of the disclosure.

FIG. 10 illustrates a schematic diagram of an example UE 104 from which a communications session may be transferred, in accordance with example embodiments of the disclosure. The UE 104 may have a user interface 1002 on which communications session information may be displayed to the user 102. Although in this example, the UE 104 is depicted as a smartphone and user selection is depicted as enabled by a touch screen, it should be understood that the disclosure herein contemplates any variety of UEs 104 as discussed herein, as well as any variety of user interfaces.

The user 102 of UE 104 may be engaged in a communications session, such as in the form of an A/V call with Bob. A video display and call time may be displayed on the user interface 1002. Additionally, a number of functions may be presented for selection to the user 102. For example, the user 102 may be able to invoke the dialer (e.g., an alphanumeric virtual keypad to select and/or enter contact information or other information). The user 102 may also be able to add or remove other callers from the current communications sessions, again by way of user selections.

Selectable functions 1004, 1006, such as for transferring the communications session to one of the user's other devices may also be presented. For example, the user 102 selecting selection 1004 may prompt the UE 104 to cooperate with the A/V call system 120 to transfer the current communications session to the user's laptop computer. Similarly, the user 102 selecting selection 1006 may prompt the UE 104 to cooperate with the A/V call system 120 to transfer the current communications session to the user's tablet. These transfers may be performed by the mechanisms as described herein.

The illustrated aspects of the claimed subject matter may also be practiced in distributed computing environments where certain tasks are performed by remote processing devices that are linked through a communications network. In a distributed computing environment, components can be located in both local and remote memory storage devices.

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

The disclosure is described above with reference to block and flow diagrams of systems, methods, apparatuses, and/or computer program products according to example embodiments of the disclosure. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, or may not necessarily need to be performed at all, according to some embodiments of the disclosure.

Computer-executable program instructions may be loaded onto a general purpose computer, a special-purpose computer, a processor, or other programmable data processing apparatus to produce a particular machine, such that the instructions that execute on the computer, processor, or other programmable data processing apparatus create means for implementing one or more functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks. As an example, embodiments of the disclosure may provide for a computer program product, comprising a computer usable medium having a computer readable program code or program instructions embodied therein, said computer readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

It will be appreciated that each of the memories and data storage devices described herein can store data and information for subsequent retrieval. The memories and databases can be in communication with each other and/or other databases, such as a centralized database, or other types of data storage devices. When needed, data or information stored in a memory or database may be transmitted to a centralized database capable of receiving data, information, or data records from more than one database or other data storage devices. In other embodiments, the databases shown can be integrated or distributed into any number of databases or other data storage devices.

Many modifications and other embodiments of the disclosure set forth herein will be apparent having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A system comprising:
one or more processors; and
one or more computer-readable media storing computer-executable instructions that, when executed by the one or more processors, cause the one or more processors to perform acts comprising:
initiating, by an A/V (audio/visual) call system, a communications session between a first user equipment (UE) and a second UE, the first UE registered as associated with a user profile;
receiving, by the A/V call system and from the first UE, a request to transfer the communications session to a third UE registered as associated with the user profile;
determining, by the A/V call system, responsive to the request, and based at least in part on a list of registered UEs, that the first UE and the third UE are both associated with the user profile;
adding, by the A/V call system and responsive to the request and based at least in part on the first UE and the third UE being registered as associated with the user profile, the third UE to the communications session; and
removing, by the A/V call system, the first UE from the communications session.

2. The system of claim 1, wherein the acts further comprise:
receiving, from the first UE, a second request to register the first UE to initiate or join the communications session; and
registering, based at least in part on the second request, the first UE to initiate or join the communications session.

3. The system of claim 2, wherein registering the first UE to initiate or join the communications session further comprises:
receiving, from the first UE, one or more authentication credentials associated with the user profile;
verifying the one or more authentication credentials; and
sending, to the first UE, an indication of registration.

4. The system of claim 1, wherein the acts further comprise:
receiving, from the first UE, a second request to subscribe to registration events; and
sending, to the first UE and based at least in part on the second request, an indication that the third UE is registered as associated with the user profile.

5. The system of claim 1, wherein the acts further comprise:
receiving, from the third UE, a second request to transfer the communications session to a fourth UE registered as associated with the user profile;
adding, responsive to the second request and based at least in part on the third UE and the fourth UE being registered as associated with the user profile, the fourth UE to the communications session; and
removing the third UE from the communications session.

6. The system of claim 1, wherein the second UE is associated with a second user, and wherein the acts further comprise:
adding a third UE to the communications session, the third UE associated with a second user profile.

7. The system of claim 1, wherein initiating the communications session between the first UE and the second UE further comprises:
receiving a second request from the first UE to initiate the communications session; and
initiating the communications session based at least in part on the second request.

8. The system of claim 1, wherein initiating the communications session between the first UE and the second UE further comprises:
receiving a second request from the second UE to initiate the communications session; and
initiating the communications session based at least in part on the second request.

9. The system of claim 1, wherein the communications session is an audio/video (A/V) call.

10. A computer-implemented method comprising:
receiving, by an A/V (audio/visual) call system, a first request to initiate a communications session;
initiating, by the A/V call system and based at least in part on the first request, a communications session between a first user equipment (UE) and at least one other UE;
receiving, by the A/V call system and from the first UE, a second request to transfer the communications session to a second UE;
determining, by the A/V call system, responsive to the second request, and based at least in part on a list of registered UEs, that the first UE and the second UE are both registered with a same user account;
adding, by the A/V call system and responsive to the determining that the first UE and the second UE are both registered with the same user account and the second request, the second UE to the communications session; and
removing by the A/V call system and the first UE from the communications session.

11. The computer-implemented method of claim 10, further comprising:
receiving, from the first UE, a third request to register the first UE to initiate or join the communications session; and
registering, based at least in part on the third request, the first UE to initiate or join the communications session.

12. The computer-implemented method of claim 10, further comprising:
receiving, from the first UE, a third request to subscribe to registration events; and
sending, to the first UE and based at least in part on the third request, an indication that the second UE is registered with the same user account.

13. The computer-implemented method of claim 10, further comprising:
receiving a third request from the first UE to initiate the communications session; and
initiating the communications session based at least in part on the third request.

14. The computer-implemented method of claim 10, further comprising:
receiving a third request from one of the at least one other UE to initiate the communications session; and
initiating the communications session based at least in part on the third request.

15. The computer-implemented method of claim 10, further comprising:
receiving, from the second UE, a third request to transfer the communications session to the first UE;

determining, responsive to the third request, that the first UE and the second UE are both registered with a same user account;

adding, responsive to the determining that the first UE and the second UE are both registered with the same user account and the third request, the first UE to the communications session; and removing the second UE from the communications session.

16. One or more computer-readable media storing computer-executable instructions that, when executed by one or more processors, cause the one or more processors to perform operations comprising:

receiving, by an A/V (audio/visual) call system, a first request to initiate a communications session;

initiating, by the A/V call system and based at least in part on the first request, a communications session between a first user equipment (UE) and at least one other UE;

receiving, by the A/V call system and from the first UE, a second request to transfer the communications session to a second UE;

determining, by the A/V call system, responsive to the second request, and based at least in part on a list of registered UEs, that the first UE and the second UE are both registered with a same user account;

adding, by the A/V call system and responsive to the determining that the first UE and the second UE are both registered with the same user account and the second request, the second UE to the communications session; and removing by the A/V call system and the first UE from the communications session.

17. The one or more computer-readable media of claim 16, the operations further comprising:

receiving, from the first UE, a third request to register the first UE to initiate or join the communications session; and registering, based at least in part on the third request, the first UE to initiate or join the communications session.

18. The one or more computer-readable media of claim 16, the operations further comprising:

receiving, from the first UE, a third request to subscribe to registration events; and sending, to the first UE and based at least in part on the third request, an indication that the second UE is registered with the same user account.

19. The one or more computer-readable media of claim 16, the operations further comprising:

receiving a third request from the first UE to initiate the communications session; and initiating the communications session based at least in part on the third request.

20. The one or more computer-readable media of claim 16, the operations further comprising:

receiving, from the second UE, a third request to transfer the communications session to the first UE;

determining, responsive to the third request, that the first UE and the second UE are both registered with a same user account;

adding, responsive to the determining that the first UE and the second UE are both registered with the same user account and the third request, the first UE to the communications session; and removing the second UE from the communications session.

* * * * *